_United States Patent Office_  
3,364,114  
Patented Jan. 16, 1968

3,364,114  
THERAPEUTIC COMPOSITIONS CONTAINING AMINOCYCLOBUTANOLS  
Samuel Kuna, Westfield, and Anthony W. Pircio, East Brunswick, N.J., assignors to Bristol-Myers Company, New York, N.Y., a corporation of Delaware  
No Drawing. Continuation-in-part of application Ser. No. 159,439, Dec. 14, 1961. This application Mar. 1, 1962, Ser. No. 176,782  
13 Claims. (Cl. 167—65)

This application is a continuation-in-part of our co-pending application Ser. No. 159,439, filed on Dec. 14, 1961, entitled, Therapeutic Compositions Containing Aminocyclobutanols, and now abandoned.

This invention relates to therapeutic compositions. More specifically this invention relates to therapeutic compositions containing certain aminocyclobutanols and their use for inducing various pharmacological activities such as that of reducing fever, edema, nervous excitement and blood pressure.

The pharmacologically active compounds employed in this invention, often referred to herein simply as the cyclobutanols, can be represented by the following generic formula:

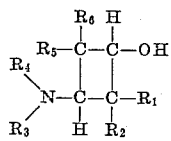

wherein each of $R_1$, $R_2$, $R_3$, $R_4$, $R_5$ and $R_6$ represents an alkyl radical having from 1 to 4 carbon atoms and particularly from 1 to 2 carbon atoms. Also, in the above generic formula, the alkyl radicals as represented by $R_3$ and $R_4$ in the tertiary amino group

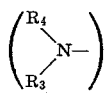

can be joined to form a tertiary amino heterocyclic radical. Thus the tertiary amino heterocyclic radical can be a saturated monocyclic heterocyclic radical containing 3, 4, 5, or 6 carbon atoms in the heterocyclic ring and which can contain a second hetero atom such as oxygen, sulfur or a second nitrogen. Also, the heterocyclic radical can have attached thereto (lower) alkyl radicals. Illustrative of the heterocyclic radicals there can be mentioned: 4-methyl-1-piperazino, 1-morpholino, 1-thiomorpholino, 1-piperidino, 1-pyrrolidino, and the like. The term (lower) alkyl is employed herein to denote an alkyl radical having from 1 to 4 carbon atoms.

Illustrative of specific cyclobutanols of the above generic formula there can be mentioned: 3 - dimethylamino-2,2,4,4-tetramethylcyclobutanol; 3-dimethylamino-2,2,4,4 - tetraethylcyclobutanol; 3-dimethylamino-2,2,4,4-tetrapropylcyclobutanol; 3 - diethylamino - 2,2,4,4-tetramethylcyclobutanol; 3-dipropylamino-2,2,4,4-tetrapropylcyclobutanol; 3 - dimethylamino-2,4-dimethyl-2,4-diethylcyclobutanol; 3-dimethylamino-2,4-dimethyl-2,4-diisopropylcyclobutanol; 3-diethylamino-2,4-dimethyl-2,4-diethylcyclobutanol; 3 - (methylethylamino)-2,2,4,4-tetramethylcyclobutanol; and 3 - (ethyl-propylamino)-2,2,4,4-tetraethylcyclobutanol. Illustrative of specific cyclobutanols having a heterocyclic radical there can be mentioned: 3-(1 - piperidino) - 2,2,4,4-tetramethylcyclobutanol; 3-(1-morpholino) - 2,2,4,4 - tetramethylcyclobutanol; 3-(4-methyl - 1 - piperazino)-2,2,4,4-tetramethylcyclobutanol; and 3-(1-pyrrolidino)-2,2,4,4-tetramethylcyclobutanol.

The novel cyclobutanols of this invention are prepared by reducing the corresponding cyclobutanones. The cyclobutanone reactant is prepared by reacting enamines, such as those derived from secondary amines and aldehydes containing one alpha-hydrogen atom with certain substituted ketenes. This reaction can be illustrated by the following equation:

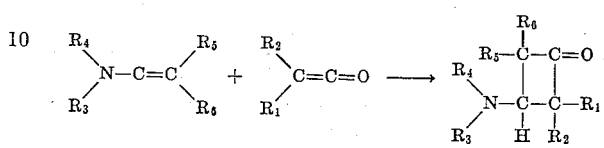

wherein each of $R_1$, $R_2$, $R_3$, $R_4$, $R_5$ and $R_6$ represent the same radical as in the generic formula of the cyclobutanols, i.e. an alkyl radical having from 1 to 4 carbon atoms or in the case of $R_3$ and $R_4$ they can also be joined with the nitrogen to form a heterocyclic radical. The above reaction can be effected by merely combining the reactants at room temperature. Reaction temperature up to the decomposition of the reactants or the reaction product can be used. Reaction times can vary from a few minutes to 20 hours depending mainly on the reaction temperature and the reactants employed. The reaction is conveniently effected under atmospheric pressure, although higher pressures or even subatmospheric pressures can be utilized. The cyclobutanone derivative product can be worked up or purified by conventional purification methods such as fractional distillation under reduced pressure, fractional crystallization from solvents, solvent extraction, chromatographic absorption and the like. The cyclobutanone can be reduced to the cyclobutanol by conventional reducing agents and recovered by conventional means.

The cyclobutanols of this invention or their pharmaceutically acceptable non-toxic acid addition salts can be administered to animals by the conventional methods, the conventional types of unit dosages or with the conventional pharmaceutical carriers to produce the various pharmacological activities. Oral administration by the use of tablets, capsules or in liquid form such as suspensions, solutions or emulsions is preferred. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch.

The acid addition salts are formed by the conventional techniques of neutralizing the amine portion of a compound with either an organic or inorganic acid. Illustrative of the acids there can be mentioned hydrochloric, sulfuric, citric, acetic, malic, maleic, and phosphoric acids.

The unit dosage or therapeutically effective quantity of the cyclobutanols can vary over fairly wide limits such as about 1.0 to about 400.0 mg. per kilogram of animal weight and particularly from about 5.0 to about 100.0 mg. per kilogram of animal weight. Since the cyclobutanols evidence their therapeutic activity in small doses it is preferable when administered to certain animals to use smaller doses per administration than that for other animals, e.g. those which can be incorporated in easily swallowable tablets or capsules. Thus, quantities varying from about 0.1 grain to about 20 grains can be employed. For oral administration it is preferred that the dose range be from about 0.2 grain to about 10 grains per subject; about 0.3 to 4 grains per subject when administered subcutaneously and about 0.2 to 2 grains per subject when administered intravenously. Of course the dosage of the particular therapeutic agent used can vary considerably, such as the age of the subject and the degree of therapeutic effect desired. When used with pharmaceutical carriers, each unit dosage form of the therapeutic cyclobutanol can contain from about 5% to about 95% and preferably from about 10% to about 80% of the cyclobutanol by weight of the entire composition with the remainder comprising conventional pharmaceutical carriers. The term "pharmaceutical carriers" is intended to include non-therapeutic materials which are conventionally used with unit dosages and includes fillers, diluents, binders, lubricants disintegrating agents and solvents. Of course, it is possible to administer the cyclobutanols or their acid addition salts without the use of a pharmaceutical carrier. The therapeutic agents of this invention can be administered as may be appropriate either prior to or after the onset of the condition to be treated, e.g. as antipyretics to reduce fever or simply to lower the body temperature; anti-inflammatory agents for relieving edematous conditions such as are caused by arthritis; as sedatives to reduce hyperexcitability; and for lowering blood pressure or relieving hypertension.

A preferred therapeutic use of the cyclobutanols is as hypotensives and can thus be used in the alleviation and control of essential hypertension, labile hypertension, and the like. The advantageous properties of the cyclobutanols when used as hypotensives include rapid effective response when administered orally whereas many hypotensives must be administered parenterally; they are rapidly metabolized and excreted; the effective therapeutic dose can readily be controlled by oral administration since substantially total systemic absorption of the cyclobutanols occurs, whereas many other hypotensives such as quaternary amine compositions have variable absorptions; they possess both ganglionic blocking and central depressant activity; and since they also possess sedative activity it is not necessary to administer a sedative separately as is conventionally practiced with the administration of hypotensives, especially for those suffering from labile hypertension.

The following examples illustrate the invention:

EXAMPLE 1

A suitable formulation for tablets consists of:

| | Grams |
|---|---|
| (1) 3 - dimethylamino-2,2,4,4-tetramethylcyclobutanol | 25 |
| (2) Mannitol | 160 |
| (3) Starch | 10 |
| (4) Magnesium stearate | 4 |

The cyclobutanol, mannitol and starch are thoroughly mixed and granulated. For tabletting, the magnesium stearate is added, mixed with the granules, and the mixture is tabletted on a rotary press. Use of this procedure can produce 100 tablets, each containing 250 mg. of the active therapeutic agent.

EXAMPLE 2

Another suitable formulation for tablets consists of:

| | Grams |
|---|---|
| (1) 3 - dimethylamino-2,2,4,4-tetramethylcyclobutanol | 25 |
| (2) b-lactose | 70 |
| (3) Dextrin | 10 |
| (4) Hydrogenated vegetable oil | 0.5 |
| (5) Talc | 2 |

The cyclobutanol, b-lactose, and dextrin are thoroughly mixed and granulated. For tabletting, the hydrogenated vegetable oil and talc are added, mixed with the granules, and the mixture tabletted on a rotary press. Use of this procedure can produce 200 tablets with each tablet containing 125 mg. of active therapeutic agent.

EXAMPLE 3

This example shows the antipyretic activity of 3-dimethylamino-2,2,4,4-tetramethylcyclobutanol on rats. The method employed for this example is that which is reported by Eagle and Carlson, Journal of Pharmacology and Experimental Therapeutics, vol. 99, page 450 (1950), and which is often referred to as the brewer's yeast method. The results of the experiment which show the drop in temperature at different time periods after the administration of the therapeutic agent from an induced fever of approximately 103° F. is shown in Table I.

TABLE I

| | Number of Animals | Average Body Temperature (° F.) | | |
|---|---|---|---|---|
| | | Before administration of drug | 1 hour after administration of drug | 3 hours after administration of drug |
| 3-dimethylamino-2,2,4,4-tetramethyl-cyclobutanol, 200 mg. per kg. of animal weight | 5 | 102.7 | 98.1 | 97.7 |
| Controls | 5 | 103.1 | 102.9 | 102.7 |

It can be seen from the data in Table I that the administration of the cyclobutanol caused the fever to drop 4.6° F. within one hour and 5° F. after three hours, whereas the temperature of the controls dropped only 0.4° F. after three hours.

EXAMPLE 4

This example shows the anti-inflammatory activity of 3 - dimethylamino-2,2,4,4-tetramethylcyclobutanol. The method employed was that of R. Domenjoz and W. Theobald, "Antimalarials in Rheumatoid Arthritis," Experientia, vol. 14, page 33 (Jan. 15, 1958). Essentially, the method comprises the steps of: (a) orally administering to a rat a material to be tested for anti-inflammatory activity; (b) inflaming the animal's right hind paw with a subcutaneous injection of 0.1 ml. of a 3% aqueous formalin solution 30 minutes after administration of the material to be tested; (c) sacrificing the animal at a predetermined time after the formalin injection (a two-hour period was used in this example); (d) amputating the animal's right hind paw; and (e) comparing the volume of the amputated paw of the animal which was given the test material with the amputated right paw of a similar rat which had not received the test material but which was treated in the same manner in all other respects. The method is conducted by using ten rats for the test material and ten rats as controls and the total difference in volume of the paws of treated and untreated animals is compared. The results of this example are given in Table II.

TABLE II

|  | Dose in mg. per kg. of animal weight | Number of animals | Volume of 10 paws (cc.) | Change in Volume (cc.) | Reduction in swelling (cc.) | Percent inhibition in swelling |
| --- | --- | --- | --- | --- | --- | --- |
| 3-dimethylamino-2,2,4,4-tetramethylcyclobutanol | 400 | 10 | 14.8 | +4.8 | 2.0 | 29 |
| Control: |  |  |  |  |  |  |
| Inflamed |  | 10 | 16.8 | −6.8 |  |  |
| Normal |  | 10 | 10 |  |  |  |

It can be seen from Table II that the cyclobutanol inhibited edema.

EXAMPLE 5

This example shows the decrease in spontaneous activity (motor depressant) and induction of sedation of 3-dimethylamino-2,2,4,4-tetramethylcyclobutanol. The example was performed by orally administering to mice a predetermined quantity of 3-dimethylamino-2,2,4,4-tetramethylcyclobutanol. Mice which had not received the cyclobutanol were used as controls. Ten minutes after administration of the cyclobutanol the treated and untreated mice were individually and in alternate sequence placed in a circular chamber having a plurality of photoelectric cells and cooperating beams of light with means to count the number of times the beams of light were broken. The number of times the beams were broken is referred to as the activity count. Each animal remained in the chamber for four minutes. The results of this example are shown in Table III which gives the percent decrease in activity of the mice which received the cyclobutanol derivative as compared with the mice which were used as controls. The percent reading and the activity count represent the numerical average.

TABLE IV.—CAROTID BLOOD PRESSURE RESPONSE TO DIMETHYLAMINO-2,2,4,4-TETRAMETHYLCYCLOBUTANOL

| Cat No. | Mk./kg. Dose | Route | Control | Time after administration of drug in minutes | | | | | | | | | | |
| --- | --- | --- | --- | --- | --- | --- | --- | --- | --- | --- | --- | --- | --- | --- |
|  |  |  |  | 1 | 5 | 10 | 15 | 30 | 45 | 60 | 90 | 120 | 150 | 180 |
| 1 | 2.5 | I.v. | 130 | 70 | 60 | 85 | 90 | 100 | 105 | 110 |  |  |  |  |
| 2 | 1.7 | I.v. | 135 | 35 | 50 | 65 | 65 | 70 | 70 | 85 | 95 | 115 |  |  |
| 3 | 200 | Oral | 120 | 100 | 60 | 60 | 60 | 60 | 50 | 60 | 70 | 80 |  |  |
| 4 | 50 | do | 125 | 125 | 115 | 85 | 75 | 65 | 70 | 70 | 80 | 95 | 110 | 110 |
| 5 | 10 | do | 100 | 100 | 90 | 85 | 80 | 70 | 75 | 75 | 75 | 75 | 75 | 75 |
| 6 | 25 | do | 160 | 150 | 110 | 110 | 100 | 100 | 80 | 80 | 80 | 90 | 90 | 100 |

The data in Table IV shows that the cyclobutanol significantly lowers the blood pressure of normal anesthetized cats by either parenteral or oral administration. The oral absorption of effective amounts of this compound occurs within five minutes after adminstration.

EXAMPLE 7

This example shows the ganglionic blocking activity of 3-dimethylamino-2,2,4,4-tetramethylcyclobutanol. Cats of both sexes were used. The experimental animals were anesthetized with sodium pentobarbital, 30 mg. kg. of animal weight administered intraperitoneally. The ganglionic blocking acivity was determined by measuring the effect of the drug on contractions of the nictitating membrane elicited by preganglionic stimulation of the cervical sympathetic nerve. After isolating the cervical

TABLE III

|  | Dose in mg. per kg. of animal weight | Number of Animals | Activity Count (Average) | Percent Decrease in Activity |
| --- | --- | --- | --- | --- |
| 3-dimethylamino-2,2,4,4-tetramethyl-cyclobutanol | 200 | 10 | 123 | 40.9 |
| Controls |  | 10 | 208 |  |

EXAMPLE 6

This example shows the reduction of blood pressure in cats by the administration of 3-dimethylamino-2,2,4,4-tetramethylcyclobutanol. Cats of both sexes were used. The experimental animals were anesthetized with sodium pentobarbital, 30 mg. per kg. of animal weight being administered intraperitoneally. Arterial pressure was recorded kymographically by means of the standard mercury manometer follower direct cannulation of the corotid artery, the trachea was cannulated for the recording of respiration, the femoral vein was cannulated for intravenous injections. Oral administrations were made directly into the stomach via an intubation tube. A period of 30 minutes was allowed to elapse after the operation for inserting the cannulas before the administration of the test drug in order to permit the blood pressure to become stabilized and to take the blood pressure reading before administration of the drug, which reading is referred to as the control. The results of this example are tabulated in Table IV.

sympathetic nerve, the voltage applied to the nerve which gave maximal response to each cat was determined. This varied between one and three volts. The other characters of the stimulus were kept constant; square wave, 10/sec.; pulse duration, 15 msec. (Gross stimulator). Maximal contractions were elicited at intervals of three minutes. After four control contractions had been obtained, the various doses of the blocking drugs were administered at the end of a 30 second stimulation period, and the periodic stimulation was continued until recovery occurred. By using this procedure it was possible to determine the maximal inhibitory effect expressed as percent inhibition of the mean control responses and the time for recovery. The results of this example are shown in Table V.

TABLE V.—COMPARATIVE GANGLIONIC BLOCKING EFFECTS OF 3-DIMETHYLAMINO-2,2,4,4-TETRAMETHYLCYCLOBUTANOL (COMPOUND A) AND HEXAMETHONIUM BROMIDE

| Compound | Mg./kg. Dose (I.v.) | Nictitating Membrane Maximum Inhibition (Percent) | Mg./kg. ED₅₀* |
|---|---|---|---|
| A | 1 | 51.7 | |
| A | 0.5 | 35.5 | |
| A | 0.5 | 24.0 | 0.95 |
| A | 0.7 | 39.0 | |
| Hexamethonium bromide | 0.5 | 50.0 | 0.50 |

*The average dose of test drug which inhibits the contraction of the nictitating membrane 50%.

The ability of 3-dimethylamino-2,2,4,4-tetramethylcyclobutanol to block impulses through the sympathetic ganglia appears from these data to be approximately one-half that of hexamethonium bromide. Since the hypotensive activity of this cyclobutanol is at least the equivalent of hexamethonium bromide, it appears that the blood pressure lowering activity of a cyclobutanol is due to not only its ganglionic blocking activity but to some other as yet unidentified effect.

The cyclobutanols employed in this invention have a comparatively low toxicity. The $LD_{50}$ in mice of 3-dimethylamino-2,2,4,4-tetramethylcyclobutanol when given orally is about 2,000 mg. per kg. of animal weight. Table VI shows the oral $LD_{50}$ of 3-dimethylamino-2,2,4,4-tetramethylcyclobutanol and the clinically used ganglionic blocking agents by using mice as the test animal.

TABLE VI

Compound:                   Oral $LD_{50}$ mg./kg. in mice
- Chlorisondamine _____ 401
- Hexamethonium _____ 484
- Mecamylamine _____ 93
- 3-dimethylamino-2,2,4,4-tetramethylcyclobutanol _____ 2,000

EXAMPLE 8

*Preparation of 3-dimethylamino-2,2,4,4-tetramethylcyclobutanone*

Into a three-necked flask equipped with a stirrer and a Dry Ice condenser was charged 2400 g. (24 moles) of N,N-dimethylisobutenylamine. After the system was flushed with nitrogen, about 12 moles of dimethylketene was passed in over a period of 7 hrs. The reaction vessel was cooled in an ice bath. After standing for 24 hrs. at room temperature, the reaction solution was examined by gas chromatography and found to consist primarily of unreacted N,N-dimethylisobutenylamine, dimethylketene dimer and the product, 3-dimethylamino-2,2,4,4-tetramethylcyclobutanone, together with 2 minor components. Distillation through a 4-ft. Podbielniak Helipak column gave 1850 g. of recovered N,N-dimethylisobutenylamine and 842.7 g., B.P. 91°–92.5° C. (27.5 mm.), (purity 95% by gas chromatography) of 3-dimethylamino-2,2,4,4-tetramethylcyclobutanone. This is a yield of 86% based on N,N-dimethylisobutenylamine consumed. In order to obtain a sample for analysis, some of the 95% material was dissolved in dilute hydrochloric acid, extracted with ether, neutralized with sodium hydroxide and extracted with ether. The organic layer was washed with water, then dried over anhydrous magnesium sulfate and distilled through an 8-in. Vigreux column, B.P. 92° C. (27 mm.), $n_D^{20}$ 1.4439.

*Analysis.*—Calcd. for $C_{10}H_{19}NO$: C, 71.1; H, 11.2; N, 8.3; neut. equiv., 169. Found: C, 71.3; H, 11.2; N, 8.1; neut. equiv., 170.

EXAMPLE 9

*Preparation of 3-dimethylamino-2,2,4,4-tetramethylcyclobutanol*

To a stirred solution of 50 g. (0.3 mole) of 3-dimethylamino-2,2,4,4-tetramethylcyclobutanone, obtained from Example 8, in 75 ml. of ethanol was added slowly a solution of 3.8 g. (0.1 mole) of sodium borohydride in 25 ml. of water. The reaction was exothermic, but the temperature was kept at 25–30° C. by means of a water bath. The reaction mixture was stirred for 1 hr. after the addition was complete, then heated in an evaporating dish on the steam bath for 1 hr. To this residue was added 300 ml. of ether. The ether layer was separated, washed with water and dried over anhydrous magnesium sulfate. Evaporation of this solution yielded 46.8 g. (92%) of 3-dimethylamino-2,2,4,4-tetramethylcyclobutanol as a white crystalline solid. To prepare a sample for analysis, some of this solid was dissolved in warm hexane and the solution chilled in Dry Ice to precipitate the solid. A material of M.P. 70–72° C. was obtained by rapid filtration of this solution.

*Analysis.*—Calcd. for $C_{10}H_{21}NO$: C, 70.3; H, 12.3; N, 8.2; neut. equiv., 171. Found: C, 70.3; H, 12.5; N, 8.1; neut. equiv., 171.8.

The cyclobutanol produced by this example was found to be a mixture of the trans- and cis-isomers with at least 90% thereof being trans. These geometric isomers can be separated from each other by conventional means such as fractional crystallization. The pure trans- isomer was found to have a melting point of 80° C. to 82° C. while the pure cis-isomer has a melting point of 129° C. to 130° C. The trans-isomer is preferred since it has greater pharmacological activity than the cis-form.

EXAMPLE 10

*Preparation of cis-3-dimethylamino-2,2,4,4-tetramethylcyclobutanol*

A solution of 100 g. of 3-dimethylamino-2,2,4,4-tetramethylcyclobutanone in 500 ml. of isooctane, containing 30 g. of a 5% ruthenium-on-powdered-carbon catalyst (Baker), was hydrogenated in a stainless steel rocking autoclave at 100° and under 3000 p.s.i. pressure of hydrogen for 4 hours. The catalyst was removed by filtration and washed with 300 ml. of methanol. The filtrate was distilled through a 6-in. Vigreux column to a pot temperature of 150°. The residue, which solidified on cooling, was recrystallized from hexane to give 32 g. of impure cis-3-dimethylamino-2,2,4,4-tetramethylcyclobutanol. A second recrystallization from hexane gave 28 g., M.P. 129–130° C.

What is claimed is:

1. A therapeutic composition in unit dosage form comprising a significant quantity of a pharmaceutical carrier and from about 0.1 to 20 grains of a material selected from the group consisting of cyclobutanols and non-toxic salts thereof to supply about 1 to about 400 mg. per kilogram of animal body weight of active material, said cyclobutanols have the formula:

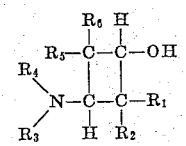

wherein each of $R_1$, $R_2$, $R_3$, $R_4$, $R_5$ and $R_6$ is lower alkyl and $R_3$ and $R_4$ when taken together represent a member selected from the group consisting of piperazino, morpholino, thiomorpholino, piperidino and pyrrolidino.

2. The therapeutic composition of claim 1 wherein each lower alkyl has from 1 to 2 carbons.

3. A therapeutic composition according to claim 1 containing about 0.2 to 10 grains of 3-dimethylamino-2,2,4,4-tetramethylcyclobutanol.

4. A composition according to claim 3 wherein said 3-dimethylamino-2,2,4,4-tetramethylcyclobutanol is present in the range of from 5 to about 100 mgs.

5. A therapeutic composition according to claim 1 wherein said cyclobutanol is present in quantities ranging from 5 to about 100 mgs.

6. A method for reducing blood pressure which comprises administering to an animal suffering from hypertension a therapeutically effective quantity of a material selected from the group consisting of cyclobutanols and non-toxic salts thereof, said cyclobutanols having a formula:

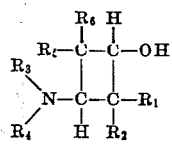

wherein each of $R_1$, $R_2$, $R_3$, $R_4$, $R_5$ and $R_6$ is lower alkyl and $R_3$ and $R_4$ when taken together represent a member selected from the group consisting of piperazino, morpholino, thiomorpholino, piperidino and pyrrolidino.

7. The method of claim 6 wherein each lower alkyl has from 1 to 2 carbons.

8. A method for inducing sedation which comprises administering to an animal suffering from nervous excitement a material selected from the group consisting of cyclobutanols and non-toxic salts thereof wherein the cyclobutanol has the formula:

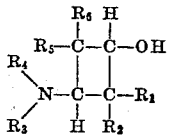

wherein each of $R_1$, $R_2$, $R_3$, $R_4$, $R_5$ and $R_6$ is lower alkyl.

9. A method for inducing sedation which comprises administering to an animal suffering from nervous excitement from about 0.2 to 10 grams of 3-dimethylamino-2,2,4,4-tetramethylcyclobutanol.

10. A method for relieving edema which comprises administering to an animal suffering from edema a therapeutically effective quantity of a material selected from the group consisting of cyclobutanols and non-toxic acid salts thereof wherein the cyclobutanol has the formula:

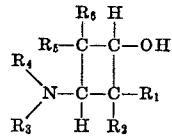

wherein each of $R_1$, $R_2$, $R_3$, $R_4$, $R_5$ and $R_6$ is lower alkyl.

11. A method for relieving an edematous condition which comprises administering to an animal suffering from edema, from about 0.2 to 10 grains of 3-dimethylamino-2,2,4,4-tetramethylcyclobutanol.

12. A method for relieving fever which comprises administering to an animal suffering from fever a therapeutically effective quantity of a material selected from the group consisting of cyclobutanols and non-toxic salts thereof wherein the cyclobutanol has the formula:

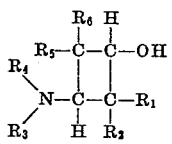

wherein each of $R_1$, $R_2$, $R_3$, $R_4$, $R_5$ and $R_6$ is lower alkyl.

13. A method for relieving fever which comprises administering to an animal suffering from fever, from about 0.2 to 10 grains of 3-dimethylamino-2,2,4,4-tetramethylcyclobutanol.

References Cited

UNITED STATES PATENTS 3,004,889  10/1961  Kuna et al. _____ 167—65
3,051,622  8/1962  Kuna et al. _____ 167—65

ALBERT T. MEYERS, *Primary Examiner.*

F. CACCIAPAGLIA, JR., J. LEVITT, *Examiners.*

P. SABATINE, E. FRANK, S. ROSEN, L. RANDALL,
*Assistant Examiners.*